United States Patent
Gautier et al.

(10) Patent No.: US 8,478,720 B2
(45) Date of Patent: Jul. 2, 2013

(54) FILE REPAIR METHOD FOR A CONTENT DISTRIBUTION SYSTEM

(75) Inventors: Eric Gautier, Rennes (FR); Rémi Houdaille, Cesson Sevigne (FR); Willem Lubbers, Cesson Sevigne (FR)

(73) Assignee: Thomson Licensing, Issy les Moulineaux (FR)

( * ) Notice: Subject to any disclaimer, the term of this patent is extended or adjusted under 35 U.S.C. 154(b) by 494 days.

(21) Appl. No.: 12/310,766

(22) PCT Filed: Aug. 28, 2007

(86) PCT No.: PCT/EP2007/058942
§ 371 (c)(1),
(2), (4) Date: Mar. 6, 2009

(87) PCT Pub. No.: WO2008/031721
PCT Pub. Date: Mar. 20, 2008

(65) Prior Publication Data
US 2009/0240701 A1    Sep. 24, 2009

(30) Foreign Application Priority Data
Sep. 15, 2006  (EP) .................................... 06291464

(51) Int. Cl.
*G06F 17/30* (2006.01)
*G06F 17/00* (2006.01)

(52) U.S. Cl.
USPC ............ 707/613; 707/620; 707/899; 714/6.1; 714/15; 714/16; 714/17; 714/18; 714/19; 714/20

(58) Field of Classification Search
USPC ............... 707/613, 620, 899; 714/6.1, 15–20
See application file for complete search history.

(56) References Cited

U.S. PATENT DOCUMENTS

| | | | |
|---|---|---|---|
| 7,596,567 B2 * | 9/2009 | Lai et al. | 1/1 |
| 7,707,457 B2 * | 4/2010 | Marchand | 714/18 |
| 2003/0182373 A1 | 9/2003 | Soto et al. | |
| 2006/0023732 A1 * | 2/2006 | Vedantham et al. | 370/432 |
| 2006/0165014 A1 | 7/2006 | Ikeda | |

FOREIGN PATENT DOCUMENTS

| | | |
|---|---|---|
| JP | 2004072551 | 3/2004 |
| JP | 2006209326 | 8/2006 |

OTHER PUBLICATIONS

NTT Docomo et al. : "Point-to-point repair mechanism for MBMS file download service, Tdoc S4-040038", Technical Specification Group Services and Systems Aspects, Feb. 23, 2004, pp. 1-4, XP002375819.

(Continued)

*Primary Examiner* — Yicun Wu
(74) *Attorney, Agent, or Firm* — Robert D. Shedd; Jeffrey M. Navon

(57) ABSTRACT

The present invention concerns a file repair method for recovering a file, in a system for distributing content to more than one receiver, comprising, at a first receiver, the steps of receiving a set of files in a push multicast from a transmitter, receiving an identifier of a second receiver that owns a missing file that is not comprised in the received set of file; and recovering the missing file from the second receiver in a pull mode using a peer-to-peer mechanism. Another object of the invention is a method for file recovery in a server and in a peer device.

3 Claims, 5 Drawing Sheets

OTHER PUBLICATIONS

Paila Nokia M Luby Digital Fountain R Lehtonen Teliasonera V Roca Inria Rhone-Alpes R Walsh Nokia T: "FLUTE-File Delivery over Unidirectional Transport" IETF Standard, Internet Engineering Task force, Oct. 2004 XP015009699.

Search Report Dated Jan. 10, 2008.
Shinichi I. "Comming P2P to be understood again", Network Magazine ASCII Corporation, vol. 10, No. 3, pp. 113-127, Mar. 1, 2005.

* cited by examiner

FILE REPAIR METHOD FOR A CONTENT DISTRIBUTION SYSTEM

This application claims the benefit, under 35 U.S.C. §365 of International Application PCT/EP2007/058942, filed Aug. 28, 2007, which was published in accordance with PCT Article 21(2) on Mar. 20, 2008 in English and which claims the benefit of European patent application No. 06291464.3, filed on Sep. 15, 2006.

The present invention relates to a method for file repair in a system for distributing content.

A distribution of content between a server and multiple receivers requires either to set up a point to point connection between the server and each receiver, or a multipoint connection. The point to point connection permits to distribute the content in a unicast means to each receiver, and provides a robust distribution. However with a significant number of receivers, it requires a heavy management of the connections. It may also dramatically enhance the traffic over the network. The multicast distribution provides less network load, with a less robust distribution. When multicast distribution is used, a solution must be found for repairing errors in the reception; for example, by means of retransmission demands. As an example for multicast delivery of content, IETF RFC 3926 defines the File Delivery over Unidirectional Transport protocol, noted FLUTE. The protocol defined in this standard is well adapted to answer the problems of scalability in terms of number of clients and heterogeneity in terms of bandwidth supported by the clients. But FLUTE does not offer a fully reliable distribution service especially when transmissions have finite duration. This is the case in such content delivery mechanism where it is necessary to support a periodic content subset update. Then a complementary reliable File Repair mechanism is to be built on top of FLUTE protocol. In a context where there is an important number of receivers, the error recovery mechanism shall be adapted in order to optimize the traffic on the network.

US 2003/182373 A1 (SOTO JUAN CARLOS [US] ET AL) 25 Sep. 2003 discloses an error recovery mechanism using the peer-to-peer method. The method discloses herein is decentralized.

US 2006/023732 A1 (VEDANTHAM RAMAKRISHNA [US] ET AL) 2 Feb. 2006 discloses a unicast error recovery mechanism.

NTT DOCOMO ET AL: "Point-to-point repair mechanism for MBMS file download service, Tdoc S4-040038" TECHNICAL SPECIFICATION GROUP SERVICES AND SYSTEM ASPECTS, XX, XX, 23 Feb. 2004, pages 1-4, XP002375819, also discloses a unicast error recovery mechanism.

The present invention concerns an efficient file repair method at the level of a receiver, a peer receiver and an index server that optimize the traffic load on the network.

To this end, the invention relates to a method for recovering a file, in a system for distributing content to more than one receiver, comprising, at a first receiver, the steps of receiving a set of files in a push multicast from a transmitter, receiving an identifier of a second receiver that owns a missing file that is not comprised in the received set of file, and recovering the missing file from the second receiver in a pull mode using a peer-to-peer mechanism.

As the file transfer from the transmitter to the receivers is not reliable, one or more files may not be correctly received. Surprisingly the receiver does not receive the missing file from the transmitter of the set of files. It receives the address of another receiver that has the missing file available for download in a peer-to-peer manner. The receivers of the content participate to the file repair mechanism. This permits to optimize the load balancing in the network and to reduce the server overload.

According to a first embodiment, the step of receiving an identifier of a second receiver comprises the steps of reporting the received files to a server and receiving the identifier of a second receiver from the server.

The receiver indicates to a server the files it has correctly received. This allows the server to know the missing files at each receiver, and then to know which receiver requires which missing file. It also allows the server to indicate to a receiver that misses a file the receivers that have correctly received the missing file.

According to a second embodiment, the step of receiving an identifier of a second receiver comprises the steps of receiving the identifier of a set of files to be received, detecting a missing file among the received set of files, reporting the missing file to a server and receiving the identifier of the second receiver from the server.

The receiver is indicated the list of files it is supposed to receive. It can then detect a missing file, and indicate the missing file to the server. This reduces the uplink traffic on the network. Indeed a receiver that has received all the files does not send any indication to the server. Only a receiver that detects a missing file sends a request to the server.

According to a third embodiment, the step of receiving an identifier of a second receiver comprises the steps of receiving an identifier of each receiver of the content, receiving an identifier of a set of files to be received, detecting a missing file among the received set of files, broadcasting a request to the other receivers for recovering the missing file, and receiving the identifier of the second receiver from the second receiver.

The server is not involved in the file repair mechanism. The file recovery is performed between receivers. This decentralized mode discharges the server.

Another object of the invention is a method for recovering a file in a system for distributing content to more than one receiver, comprising, at a server, the steps of identifying a set of files to be received by all receivers, identifying for each receiver a list of correctly received files, indicating to a first receiver that has not correctly received a file an identifier of a second receiver that has correctly received the file.

The server manages the centralized method for file repair. It identifies the list of files that have been received by each receiver, and then is able to deduce the missing files in each receiver. And for each receiver that has not correctly received a file, it indicates a peer receiver that has correctly received the file.

Another object of the invention is a method for recovering a file in a system for distributing content to more than one receiver, comprising at a first receiver the steps of receiving a set of files in a push multicast from a transmitter, receiving a request from a second receiver for recovering a file, if the file is available in the set of files, sending the file to the second receiver, and if the file is not available in the set of files, forwarding the request to other receivers.

Each receiver participates to the file repair mechanism. It makes available the received set of files to the other receivers for the repair mechanism. The set of file is downloadable in a pull mode using a peer-to-peer mechanism.

According to an embodiment, after having received the set of files, it comprises the step of indicating the received set of file to a server.

The receiver clarifies the set of files it has correctly received and that are available for the other receivers. This permits, in a centralized mode, to eliminate the erroneous requests.

According to an embodiment, the content is distributed according to the File Delivery over Unidirectional Transport protocol, noted FLUTE protocol, and the file repair method applies to a file received during a current file delivery session only.

The set of files are available in each receiver only during a period, namely the current file delivery session. After that period, the file is no longer available for repair. It might be available in the content server through a common client-server based file repair mechanism.

According to an embodiment, the step of detecting the missing file is performed with the File Delivery Table defined in the FLUTE protocol.

Another object of the invention is a computer program product comprising program code instructions for executing the steps of the processes according to the invention, when that program is executed on a computer. By "computer program product", it is meant a computer program support, which may consist not only in a storing space containing the program, such as a diskette or a cassette, but also in a signal, such as an electrical or optical signal.

The invention will be better understood and illustrated by means of the following embodiment and execution examples, in no way limitative, with reference to the appended figures on which:

Figure 1:
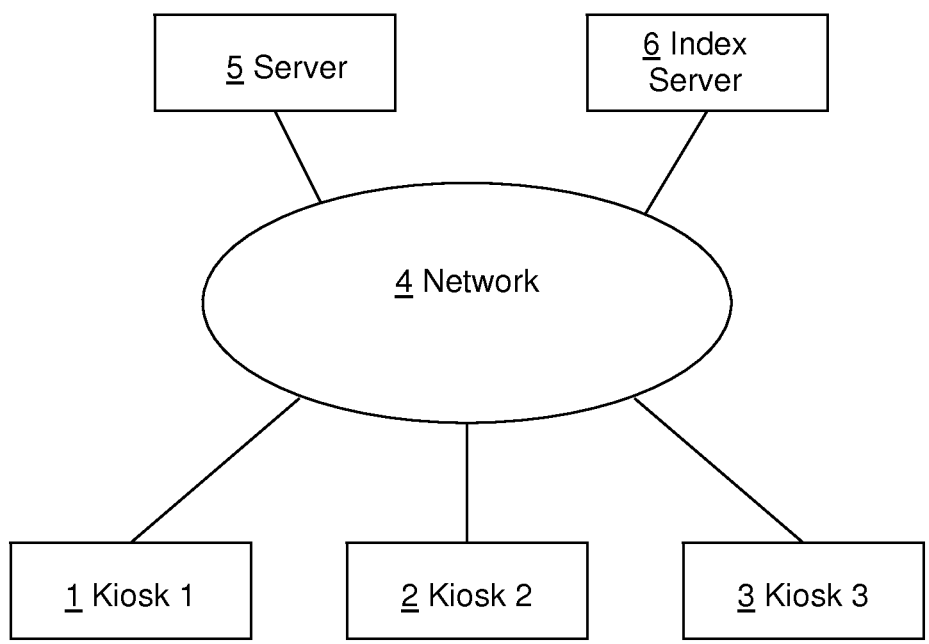
FIG. 1 is a block diagram of an the system compliant with the embodiment.
Figure 2:
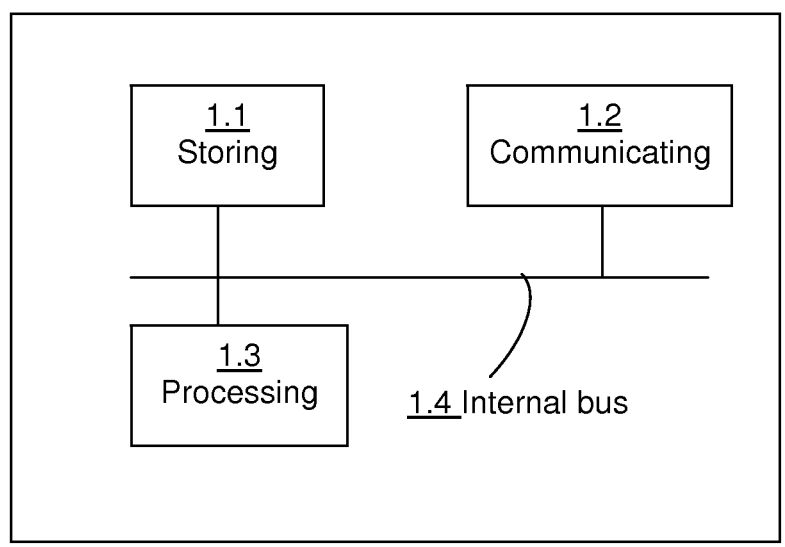
FIG. 2 is a block diagram of a device compliant with the embodiment.

In FIGS. 1 and 2, the represented blocks are purely functional entities, which do not necessarily correspond to physically separate entities. Namely, they could be developed in the form of software, or be implemented in one or several integrated circuits.

A service based on a digital subscriber line broadband network of kiosks is deployed in retailer's premises, such as supermarkets, where customers can purchase Digital Video Disks, noted DVDs. Each kiosk is equipped with a local storage to store DVD contents, at an average number of about 10,000 titles in each kiosk. A kiosk is also equipped with user interfacing means for permitting a customer to browse at the kiosk and choose contents in the kiosk through a content guide, the DVD being burnt and packaged directly inside the kiosk. Periodically, the content in each kiosk is partially updated from a content server with an incremental update, which is managed by the operator of the service. The benefit of this system in comparison with current video rental systems is that customers have access to a larger number of content references, all these references being never out of stock, and periodically renewed. The FIG. 1 describes the devices involved in the service; a server 5 sends content to several kiosks 1, 2, 3 through a network 4 being preferably the Internet. A kiosk is a client of the server 5. The FIG. 1 represents 3 kiosks, but the service might comprise thousands of kiosks. Of course the service may need the deployment of more than one server. Several servers could each provide a subset of the content to the kiosks. The index server 6 manages the file recovery as described below. The server 5 and the index server 6 might be located in a same device or in different devices.

The FIG. 2 represents building blocks of the servers 5 and 6 and the kiosks. The communicating module 1.2 intends to send and receive data through the Internet with other devices. The processing module 1.3 comprises means for running the device. The device comprises a storing module 1.1 for storing data, management files, and the firmware that permit to run the device. All the modules are interconnected by an internal bus 1.4.

In the server 5, the storing module comprises the content references. In the index server 6, the storing module comprises the list of files to deliver which can be fetched from the server 5, each file being identified with an identifier. In the kiosk, the storing module comprises the content available for being burnt and packaged. The means for DVD burning and packaging are not represented. The server manages the content delivery and the file repair procedures. Of course the content reference might be comprised in a first server that manages the content delivery procedure, and at least a second server might manage the file repair procedure.

Figure 3:
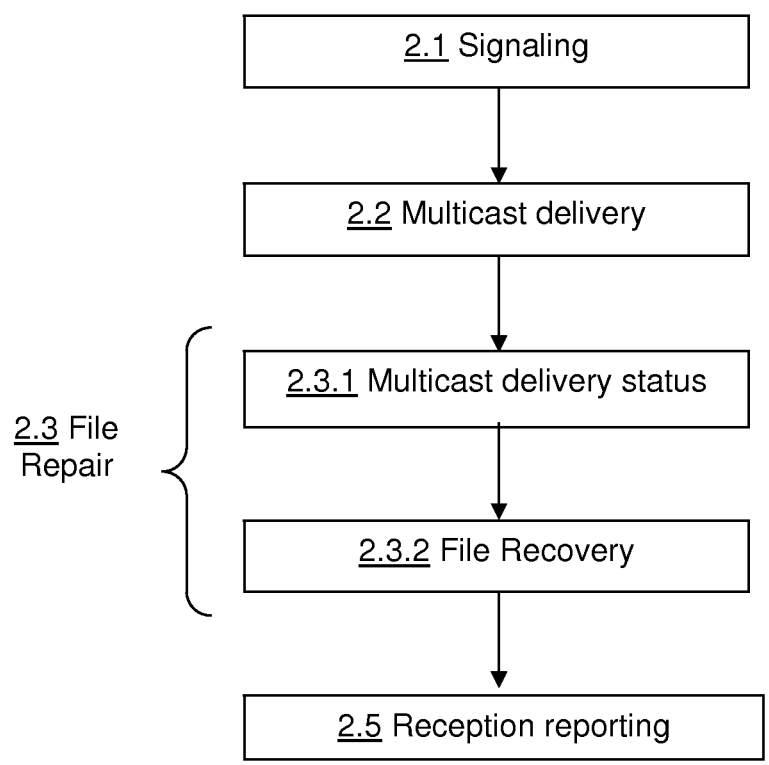
FIG. 3 is a flow chart of the distribution method of the embodiment.

The overall delivery process is summarized in the FIG. 3.

Signaling 2.1 is the step necessary to trigger off the download phase,

Multicast delivery 2.2 is the multicast content delivery phase from the server to the set of receivers.

File repair 2.3 is split in 2 steps:
Multicast delivery status 2.3.1 is the step where file repair server, if it exists, gets the status of the clients regarding the files downloaded.
File recovery 2.3.2 is the step necessary for the clients to recover the missing data.

Reception reporting 2.5 is the step where clients report the complete reception of the content to the operator.

The method for initializing the connections is as follows. When a client connects to the distribution network, it broadcasts an address resolution protocol request, noted ARP request, to the IP address of the server. The server sends a unicast ARP response to the client, indicating its MAC address. Then the client identifies itself to the server with its login and password using a file transfer protocol, noted FTP. Finally if the identification succeeds the client is connected to the server and is able to receive the content. When a new kiosk is added to the network it sends to the centralized index server its connection information (IP address, port . . . ) and can become a peer.

The method for distributing the files to the kiosks is as follows. The content delivery mechanism is closely related to the method of Video On Demand, noted VOD, referred to Push Video on Demand, noted Push VOD. Indeed in content push method, contents are stored in a device comprising a local storage, such as a hard disk, under the control of the operator. Once downloaded, this content can be played back when the consumer requests it. Content push strategy allows delivery of content in areas where real-time delivery is not possible or prone to errors. It allows the delivery of multiple simultaneous services at reduced cost as the bandwidth consumption may be limited compared to live services or VOD services based on unicast protocol, such as streaming mode VOD or download mode VOD.

A Push VOD content delivery mechanism aims at updating periodically only a subset of all the content and metadata stored in a client device. This update strategy, named incremental update, can be split in the steps described hereafter.

To trigger the download phase, an out of band signaling mechanism managed by the operator is used to announce the update of the content subset to the kiosks. This signaling mechanism is based on the Service Discovery mechanism used in DVB-IP standard, as defined in ETSI TS 102 034 v1.1.1 (2005-03) Digital Video Broadcasting (DVB): Transport of MPEG2 Based DVB Services over IP Based Networks.

After having received the announcement, the kiosks start up the download phase and the downloaded data are stored in a temporary buffer. This download mechanism is based on a multicast content delivery protocol. IETF RFC 3926 defines the File Delivery over Unidirectional Transport protocol, noted FLUTE. It is well adapted to answer the problems of scalability in term of number of kiosks and heterogeneity in term of bandwidth supported by the kiosks. FLUTE does not offer a fully reliable distribution service especially when transmissions have finite duration as it is the case in the content delivery mechanism where it is necessary to support a periodic content subset update. A complementary reliable File Repair mechanism is built on top of FLUTE protocol. The File Repair is a two levels file repair mechanism.

The first level concerns a file repair which is carried out to recover the files of the current update session. This file repair step is named "File Repair for the current delivery session". This File Repair mechanism is based on a Peer to Peer protocol, noted P2P. A P2P is a network protocol that relies on retrieval of information among member nodes instead of centralized retrieval from a single server. In a P2P model, each member node can make information available for distribution and can establish direct connections with any other member node to download information. Indeed, after a FLUTE content multicast delivery session, the content is almost spread over the kiosks; some fragments of content can be missing in each kiosk but the great part of it has been downloaded. Given this, an efficient File Repair solution based on P2P protocol can be developed. This file repair method can be referred as "pull P2P downloading". The content, i.e. the set of file, received by a receiver in a session is made available for other receivers during the current session.

The second level concerns a file repair to recover the files of the previous update sessions. This file repair step is named "File Repair for the previous delivery session" and is different from the file repair strategy used for the current update session. In this context the content received at the previous session in the kiosk has been compiled and stored as an information level. It is no longer available in the form of files as in the previous session, and then no longer available to the other receivers. Therefore, it does not enable the network traffic friendly P2P based file repair mechanism but only a more conventional client-server based file repair mechanism. In this case this file repair level is quasi-similar to the strategy adopted in DVB-H IP Data-casting standard, DVB-CBMS, <<IP Datacast over DVB-H; Content Delivery Protocols (CDP)>>, DVB Document A 101, 2005 December. The file repair strategy adopted in DVB-H IP Data-casting standard is only a one level file repair strategy and adopts the centralized client-server "File Repair" mode. It does not take the opportunity of the fact that the content is almost spread over the kiosks after the multicast step.

Once the subset of the content and metadata has been downloaded and stored in a memory buffer and when the release time of the content specified in the out of band announcement is reached, a subset of old data is swapped with the new downloaded data. This swap step between old and new downloaded data is carried out when the kiosks are not in use for the customers. The kiosks are deployed in retailer's premises and not operational by night. During the swap between old and new content, the kiosks have to erase some of their content. The list of files or directory to erase are described in the first delivery file of the session which correspond to the FLUTE/TOI=1 (Transport Object Identifier). This file is always delivered even when it is empty. In this case no content is erased. If this file is not empty but no content file is delivered, the kiosk carries out an erase operation without content download. The swap mechanism might of course take place in another manner where the kiosk is set in a suspended mode during the swap mechanism.

Once updated and swapped, the whole new content is made available for the users.

The File Repair method is now described.

According to the preferred embodiment, the centralized mode is used.

The index server knows the list of files that have been transmitted from the content server in fetching this information to the content server.

During the "multicast delivery status step" each kiosk reports to a centralized index server the received files. The index server is able to establish an index table linking the really received contents of each kiosk.

Then during the "file repair step", the server searches for matches in its index table for each kiosk where content are missing. It indicates to each kiosk a list of peer kiosks that hold the missing content. The kiosks where content are missing open a direct connection with one or more of the peers that hold the missing files and download it.

Figure 4:
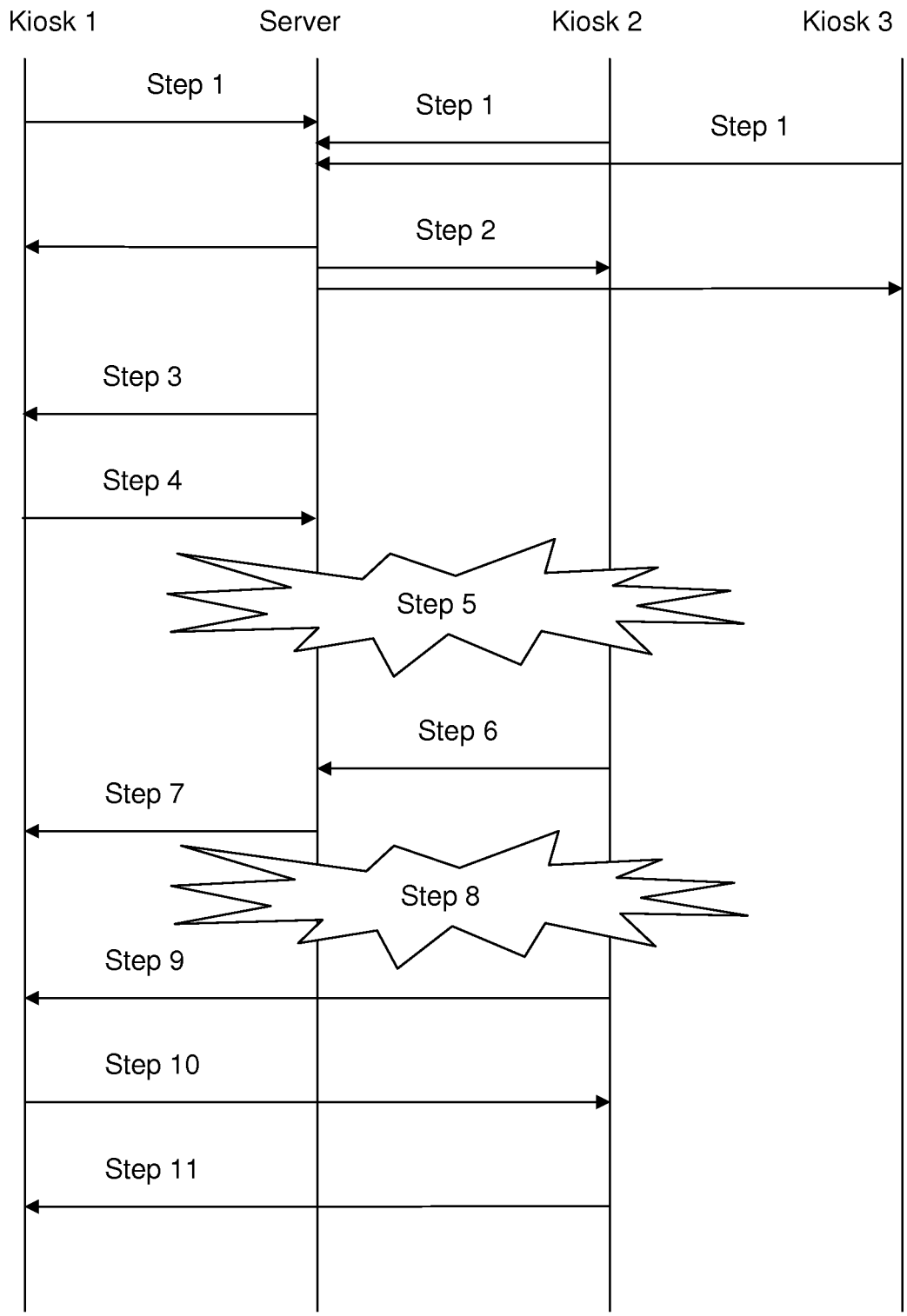
FIG. 4 is a flow chart of the file repair mechanism in the centralized mode.

The centralized method is illustrated in FIG. 4.

At step 1, each kiosk sends to the index server the list of files it shares with a TCP port number where it is accessible for a download of a file of the list.

At step 2, the index server confirms the reception of the list of files to each kiosk.

At step 3, the server inspects the received list of files to find the missing files in each kiosk. It sends an indication to each kiosk with the list of kiosks that own the missing file. In the FIG. 4, it sends an indication to the kiosk 1. At this step the server does not indicate any information on the means for connecting to the kiosks.

At step 4, the kiosk 1 sends a request to the server to download the requested file.

At step 5, the server multicasts an ARP request to the kiosks that hold the requested file. This is intended to gather the connecting mode of the kiosks.

At step 6, a kiosk, the kiosk 2, is the first that send an answer to the server on its availability to connect to the kiosk 1 for the file transfer.

At step 7, the server sends the IP address of the kiosk 2, as the kiosk that owns the file.

At step 8, the kiosk broadcasts an ARP request to identify the kiosk with the IP address of the kiosk 2.

At step 9, the kiosk 2 sends a response to the kiosk 1 with the indication of its MAC address.

At step 10 the kiosk 1 connects to the kiosk 2 to get the file.

At step 11 the kiosk 2 sends the file to kiosk 1.

According to a variant embodiment of the centralized mode each kiosk can rely on the FLUTE protocol to determine the files that are missing. Indeed the FLUTE protocol defines a File Delivery Table noted FDT, which contains the information of the files which have to be transmitted in the current session. FLUTE protocol transmits the FDT from the content server in a multicast mode to all the kiosks. As this may be subject to transmission error, the reliability of the FDT file transmission can be enhanced with mechanisms such as a forward error protection or with retransmissions of the FDT during the session, that are well known per se. So at the end of the "multicast content delivery step" each kiosk knows exactly, the files which have to be transmitted in the session and the files which have been received. Each kiosk may then indicate to the index server the files that are missing. The server then indicates to the kiosk the address(es) of another kiosk(s) that owns the missing file(s). This variant embodiment permits to minimize the traffic on the network; it is applicable when few kiosks are assumed to receive erroneous files.

According to a second embodiment, the file repair is decentralized. The index server is not involved in the file recovery step. Each kiosk is able to determine the set of files necessary to complete the reception of the content at the end of the "multicast content delivery step". In the decentralized model, a flooding mechanism is used to distribute the "file repair request" messages between the kiosks.

The algorithm in the requesting kiosk is as follows:
The kiosk identifies that a file is missing
It broadcasts a request to its peer kiosks, to query about the availability of the file.
Once the kiosk receives a message indicating that the file has been identified at another kiosk, it initiates a direct connection with this one to get the file.

As in this case there is no central coordination like the index server, the file repair step can be initiated at the beginning of the "file repair step" without a specific "multicast delivery status step".

The algorithm in a kiosk is as follows:
A kiosk receives a request from another kiosk that a file is missing,
If the kiosk does not have the file available it forwards the request.
If the kiosk has the file available, it sends a response message back along the route the query came in through, as the query itself does not contain identifying information of the kiosk where the request comes from.

To limit the spread of messages through the network each message contains a time-to-live field, noted TTL, which is decremented at each hop, each time a request reaches a kiosk. When the TTL field is null the message is dropped.

When a new kiosk is added to the network it sends a ping message to other kiosks which it is connected to, to announce itself. The kiosks send back a pong message identifying them and also propagate the ping message to their neighbors. Each message contains a "Descriptor ID" to uniquely identify the message. The ping message does not contain any payload whereas the pong message comprises the contact information such as the IP address and port, and information about the shared files such as the file number, size.

Figure 5:
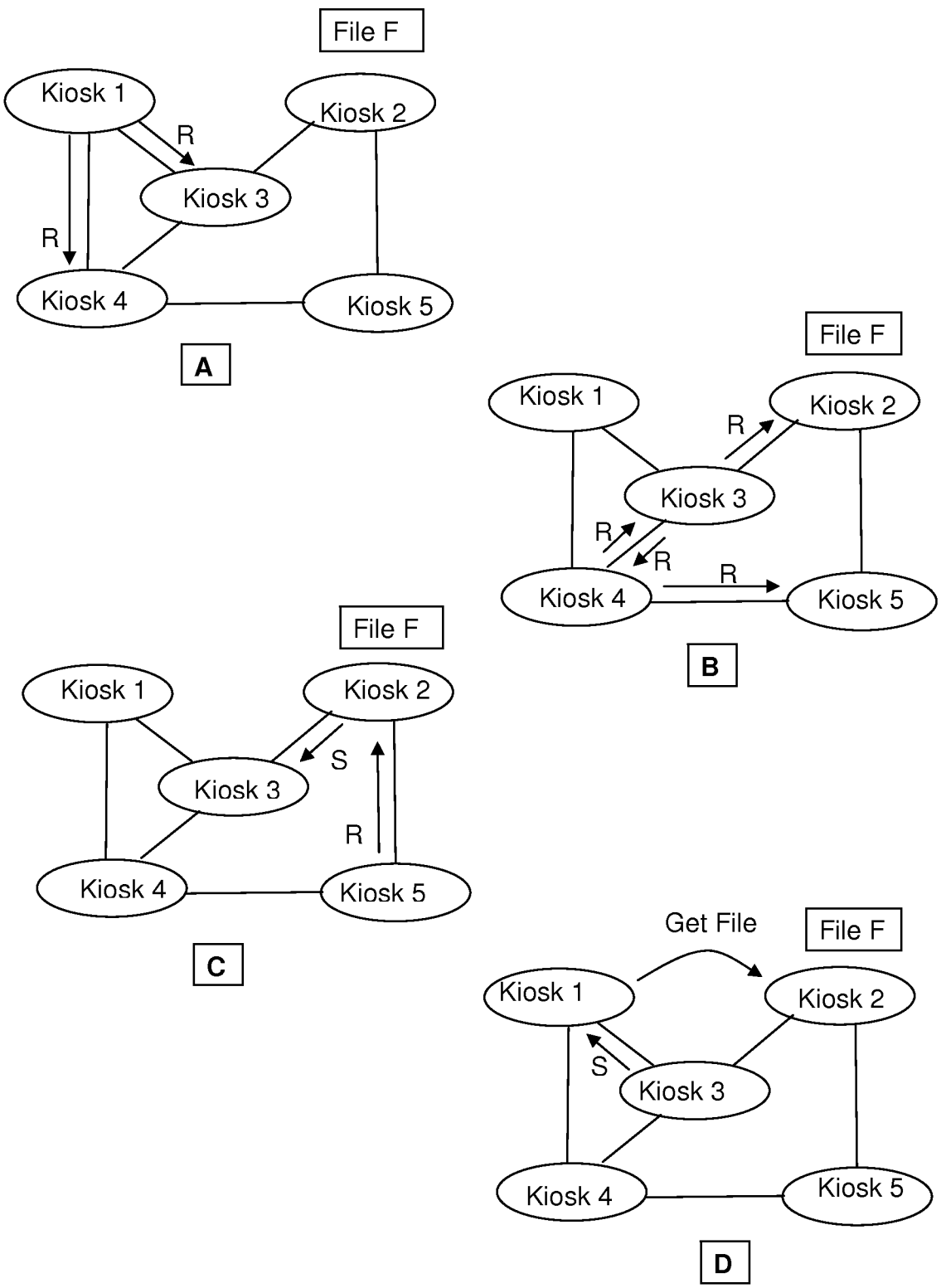
FIG. 5 is a flow chart of the file repair mechanism in the decentralized mode.

The decentralized mode is illustrated in FIG. 5.

Two types of messages are used in the decentralized mode, the request R and the success reply S. The request is sent to ask a neighbor on the availability of the missing File. The request message R contains the requested file, comprising the name and the size of the file. When a kiosk receives more than once the same request message with the same "Descriptor ID", it stops to forward this message in order to avoid loops and minimize traffic. When a requested file is identified in a kiosk, a success reply S is returned. The success message S contains the contact information (IP address, port) and the file corresponding to the search criteria (name, size).

In the scenario illustrated in FIG. 5, the kiosk 1 has not received a file F.

In the step A, the kiosk 1 sends a request to its neighbors, kiosk 3 and kiosk 4.

In the step B, as kiosk 3 and kiosk 4 don't have the file F available, they forward the request to their respective neighbors. Kiosk 3 forwards to kiosk 2 and kiosk 4, and kiosk 4 forwards to kiosk 3 and kiosk 5.

In the step C, Kiosk 2 owns the file F; it sends a success message to kiosk 3. The kiosk 5 forwards the request message to kiosk 2.

In the step D, kiosk 3 forwards the success message to kiosk 1.

The kiosk 1 is now aware on the location of the missing file F. It opens a connection with the kiosk 5 to download the file F.

Indeed the request message may comprise a list of more than one missing file. When a kiosk owns some files of the list, it sends a success message with the files, and as it does not own all the files it forwards the request to its neighbor. The initiator of the request then selects the more convenient kiosks among the one that sent a success message to download the files.

In a third embodiment, the file repair is partially centralized. It uses a scheme where a server manages the content delivery, and at least another server manages the file repair. This other server is located in a supernode. A supernode is dynamically assigned the task of servicing a small subpart of the kiosks network. A supernode indexes the files shared by kiosks connected to them and performs search requests on behalf of the kiosks. All requests are directed to the supernode of the subpart. Search time is then reduced in comparison with decentralized model.

The invention claimed is:

1. File repair method for recovering a file, for use in a system for distributing content from a transmitter to more than one receiver, said system comprising a centralized index server, said method comprising, at a first receiver, the steps of:
receiving a set of files in a push multicast content delivery step from said transmitter;
delivering a multicast status by reporting the received files to a said centralized index server;
receiving from said centralized index server an identifier of a second receiver that owns a missing file that is not comprised in said received files; and
recovering said missing file from said second receiver in a pull mode using a peer-to-peer mechanism.

2. File repair method for recovering a file, for use in a system for distributing content from a transmitter to more than one receiver, said system comprising a centralized index server, said method comprising, at a first receiver, the steps of:
receiving the identifier of a set of files to be received;
receiving a set of files in a push multicast content delivery step from said transmitter;
detecting a missing file among the received set of files;
delivering a multicast status by reporting said missing file to a said centralized index server;
receiving from said centralized index server an identifier of a second receiver that owns a missing file that is not comprised in said received set of files; and
recovering said missing file from said second receiver in a pull mode using a peer-to-peer mechanism.

3. Method according to claim 1, wherein the step of receiving an identifier of a second receiver comprises the steps of:
receiving an identifier of each receiver of the content;
receiving an identifier of a set of files to be received;
detecting a missing file among the received set of files;
broadcasting a request to the other receivers for recovering said missing file; and
receiving said identifier of said second receiver from the second receiver.

* * * * *